April 11, 1950 H. W. AUGUSTADT 2,503,540

ADJUSTABLE LOSS PARALLEL-T NETWORK

Filed May 29, 1945

INVENTOR
H. W. AUGUSTADT
BY
Ralph T. Holcomb
ATTORNEY

Patented Apr. 11, 1950 2,503,540

UNITED STATES PATENT OFFICE 2,503,540

ADJUSTABLE LOSS PARALLEL-T NETWORK

Herbert W. Augustadt, West New Brighton, N. Y., assignor to Bell Telephone Laboratories, Incorporated, New York, N. Y., a corporation of New York Application May 29, 1945, Serial No. 596,478

15 Claims. (Cl. 178—44)

Figure 1:
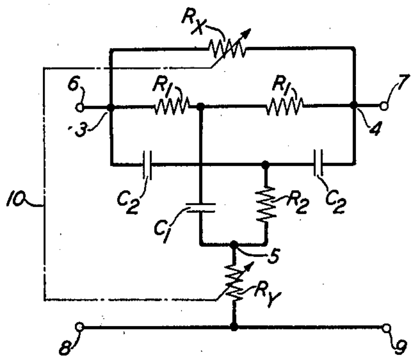

This invention relates to wave transmission networks and more particularly to networks having adjustable transmission characteristics.

The object of the invention is to adjust the magnitude of the maximum transmission loss in a wave transmission network without changing the frequency at which the maximum occurs.

In accordance with the present invention there is provided a wave transmission network having a peak of transmission loss the height of which may be adjusted without changing its frequency. The network comprises two T's, ordinarily symmetrical, connected in parallel, a resistance bridging the T's and a second resistance connected in common with the shunt branches of the T's. One of the T's comprises two series resistances and an interposed shunt reactance and the other comprises two series reactances and an interposed shunt resistance. The reactances, which are of the same sign, and the resistances forming the T's are proportioned to provide maximum transmission loss at a preassigned frequency and the bridging and common shunt resistances are proportioned to adjust the magnitude of this maximum without changing the frequency. To facilitate adjustment these latter resistances may be made variable.

Figure 2:
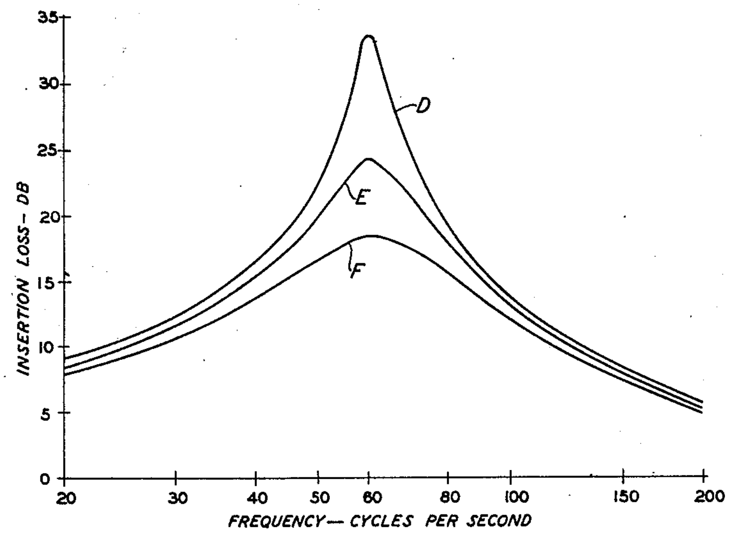

The nature of the invention will be more fully understood from the following detailed description and by reference to the accompanying drawing, in which like reference characters refer to similar or corresponding parts and in which:

Fig. 1 is a schematic circuit of a wave transmission network in accordance with the invention; and Fig. 2 shows typical transmission loss characteristics obtainable at various pairs of settings of the variable resistors.

As shown in Fig. 1 the network comprises two T's, ordinarily of symmetrical configuration, connected in parallel between the points 3, 4 and 5. One of the T's comprises two series resistances each of value $R_1$ and an interposed shunt reactance. The other T comprises two series reactances and an interposed shunt resistance of value $R_2$.

In order to provide a transmission characteristic having its maximum loss at a preassigned frequency $f_0$ the shunt reactance $\pm jX_1$ and the series reactance $\pm jX_2$ must be of the same sign and have the relationship $$X_2=4KX_1 \qquad (1)$$

where $$K=\frac{R_2}{R_1} \qquad (2)$$

If the shunt reactance is constituted by a capacitance of value $C_1$ and each of the series reactances by a capacitance of value $C_2$, as shown in Fig. 1, it follows from Equation 1 that the capacitances will have the relationship $$C_1=4KC_2 \qquad (3)$$

In this case the frequency $f_0$ is given by the expression $$f_0=\frac{1}{\pi R_1\sqrt{2C_1C_2}} \qquad (4)$$

The design relationships involved in this portion of the network, when the reactances are constituted by capacitances, are discussed in more detail in my prior United States Patent 2,106,785, issued February 1, 1938.

In order to provide means for adjusting the magnitude of the maximum loss without changing the frequency $f_0$ at which it occurs, a resistance of value $R_X$ is connected between the points 3 and 4 to bridge the T's and a second resistance of value $R_Y$ is connected at one end of the point 5, to form a common impedance in the shunt branches of the T's. The points 3 and 4 are connected, respectively, to an input terminal 6 and the corresponding output terminal 7, and the other end of the resistance $R_Y$ is connected to the remaining input terminal 8 and the output terminal 9. A suitable source of alternating electromotive force may be connected to the terminals 6 and 8 and a suitable load impedance to the terminals 7 and 9.

In order not to change the frequency $f_0$ the product of the resistances $R_X$ and $R_Y$ must be equal to a constant which depends upon $R_1$ and $R_2$ and may be expressed as $$R_XR_Y=\frac{2R_1^2R_2}{R_1+2R_2} \qquad (5)$$

To facilitate the adjustment of the loss peak the resistances $R_X$ and $R_Y$ may be made variable, as indicated by the arrows, and for convenience in maintaining the required relationship they may be arranged for unitary control, as indicated by the broken line 10.

The maximum transfer constant $\theta_{max}$ in nepers, at the frequency $f_0$, for the network is given by the expression $$\theta_{max}=2\tanh^{-1}\sqrt{\frac{1+2K}{1+2K+8Ka(1+a)}} \qquad (6)$$

where $$a=\frac{R_1}{R_X} \qquad (17)$$

Fig. 2 shows typical transmission loss characteristics obtainable with the network of Fig. 1 when operating between load impedances each equal to $R_1$. The ordinates are decibels and the abscissas cycles per second, on a logarithmic scale. Curve D is for a certain value of $R_X$, curve E for a small value, and curve F for a still smaller value. Of course it is to be understood that an infinite family of curves similar to those shown may be obtained by properly choosing the values of $R_X$ and $R_Y$. As $R_X$ is decreased, $R_Y$ is increased, and vice versa, to maintain the product constant, as given by Equation 5. The frequency $f_0$ of maximum loss $\theta_{max}$ is 60 cycles and it will be noted that this frequency does not change as the magnitude of the maximum loss is adjusted by varying $R_X$ and $R_Y$.

The required values of $R_X$ and $R_Y$ for any desired transfer constant $\theta_{max}$ may be found as follows: The maximum loss, in nepers, is substituted for $\theta_{max}$ in Equation 6 and the equation solved for $a$. Then the value of $R_X$ is found from Equation 7 and the corresponding value of $R_Y$ is found from Equation 5.

What is claimed is:

1. A wave transmission network comprising two T's connected in parallel, a variable resistance bridging said T's and a second variable resistance connected in common with the shunt branches of said T's, one of said T's comprising two series resistances and an interposed shunt reactance, the other of said T's comprising two series reactances and an interposed shunt resistance of value $R_2$, said reactances being of the same sign, the resistances and reactances comprising said T's being proportioned to provide maximum transmission loss at a preassigned frequency, and the product of said variable resistances, at every pair of settings, being approximately equal to $$\frac{2R_1^2R_2}{R_1+2R_2}$$

where $R_1$ is the value of one of the resistances in said one T.

2. A network in accordance with claim 1 in which each of said reactances is constituted by a capacitance.

3. A network in accordance with claim 1 in which said variable resistances are under a unitary control.

4. A network in accordance with claim 1 in which each reactance in said other T is approximately equal to four times the reactance in said one T multiplied by the ratio of $R_2$ to one of the resistances in said one T.

5. A network in accordance with claim 1 in which each of said reactances is constituted by a capacitance and the capacitance in said one T is approximately equal to four times one of the capacitances in said other T multiplied by the ratio of $R_2$ to one of the resistances in said one T.

6. A network in accordance with claim 1 in which said resistances in said one T are equal.

7. A wave transmission network comprising two symmetrical T's connected in parallel, a variable resistance bridging said T's and a second variable resistance connected in common with the shunt branches of said T's, one of said T's comprising two series resistances each of value $R_1$ and an interposed shunt reactance, the other of said T's comprising two equal series reactances and an interposed shunt resistance of value $R_2$, said reactances being of the same sign, the resistances and reactances comprising said T's being proportioned to provide maximum transmission loss at a preassigned frequency, and the product of said variable resistances, at every pair of settings, being approximately equal to $$\frac{2R_1^2R_2}{R_1+2R_2}$$

8. A network in accordance with claim 7 in which each of said reactances is constituted by a capacitance.

9. A network in accordance with claim 7 in which said variable resistances are under a unitary control.

10. A network in accordance with claim 7 in which each reactance in said other T is approximately equal to four times the reactance in said one T multiplied by the ratio of $R_2$ to $R_1$.

11. A network in accordance with claim 7 in which each of said reactances is constituted by a capacitance and the capacitance in said one T is approximately equal to four times one of the capacitances in said other T multiplied by the ratio of $R_2$ to $R_1$.

12. A wave transmission network comprising two symmetrical T's connected in parallel, a first resistance bridging said T's and a second resistance connected in common with the shunt branches of said T's, one of said T's comprising two series resistances each of value $R_1$ and an interposed shunt reactance, the other of said T's comprising two equal series reactances and an interposed shunt resistance of value $R_2$, said reactances being of the same sign, the resistances and reactances comprising said T's being proportioned to provide maximum transmission loss at a preassigned frequency, and the product of said first and second resistances being approximately equal to $$\frac{2R_1^2R_2}{R_1+2R_2}$$

13. A network in accordance with claim 12 in which each of said reactances is constituted by a capacitance.

14. A network in accordance with claim 12 in which each reactance in said other T is approximately equal to four times the reactance in said one T multiplied by the ratio of $R_2$ to $R_1$.

15. A network in accordance with claim 12 in which each of said reactances is constituted by a capacitance and the capacitance in said one T is approximately equal to four times one of the capacitances in said other T multiplied by the ratio of $R_2$ to $R_1$.

HERBERT W. AUGUSTADT.

REFERENCES CITED

The following references are of record in the file of this patent:

UNITED STATES PATENTS

| Number | Name | Date |
|---|---|---|
| 2,304,545 | Clement | Dec. 8, 1942 |
| 2,323,609 | Kihn | July 6, 1943 |
| 2,354,141 | Purington | July 18, 1944 |